United States Patent Office 2,875,852
Patented Mar. 3, 1959

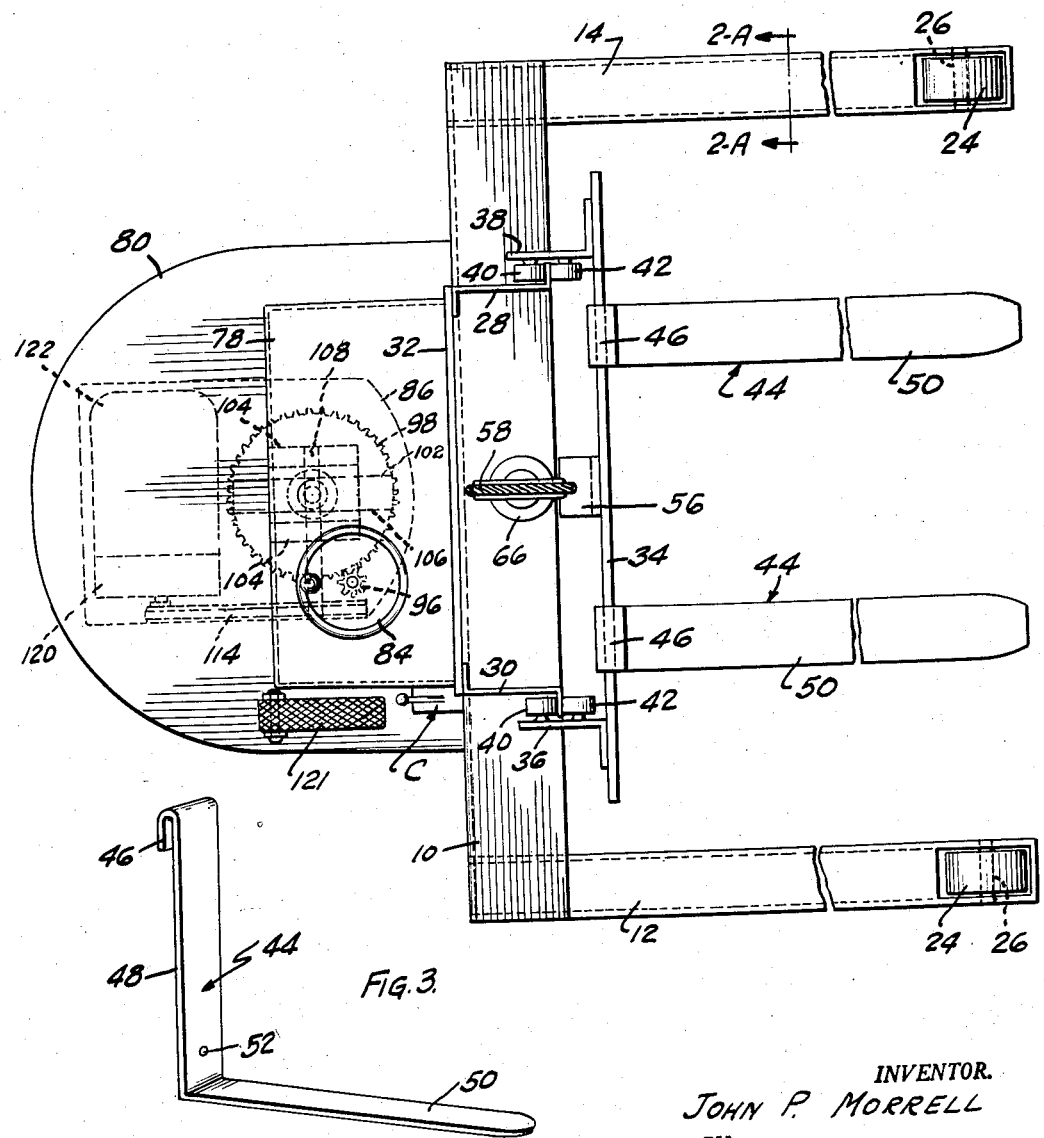

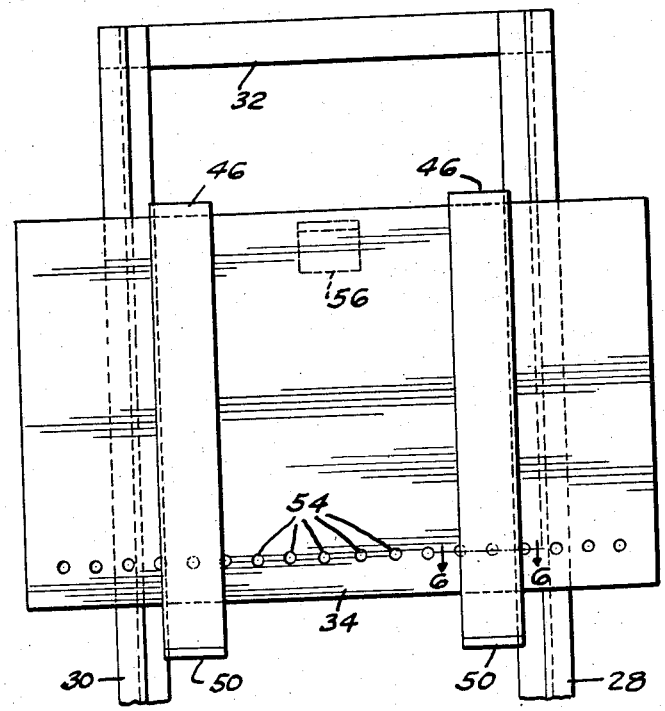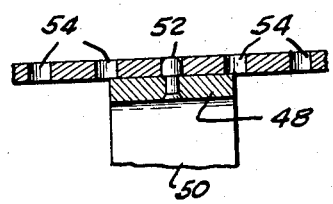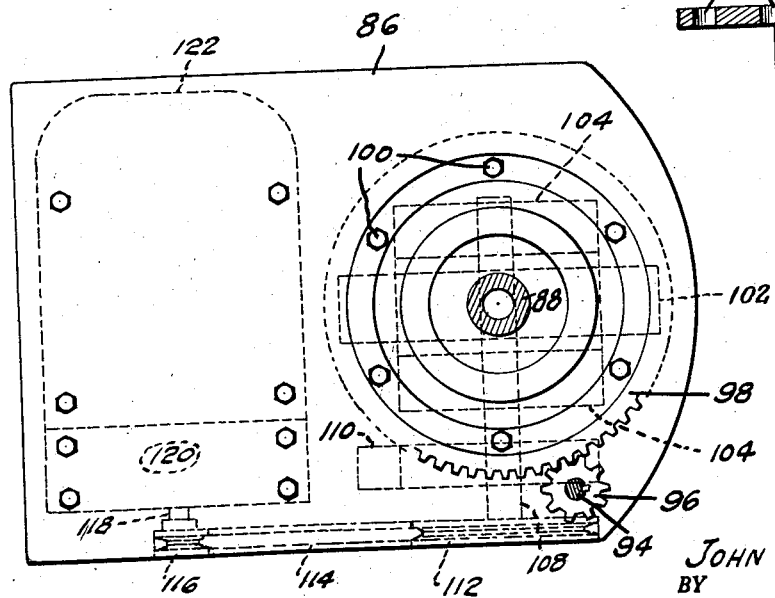

2,875,852

POWER DRIVEN MATERIAL HANDLING TRUCKS

John P. Morrell, Elgin, Ill.

Application June 21, 1954, Serial No. 438,121

1 Claim. (Cl. 187—9)

My invention relates to power driven material handling trucks and similar devices.

My invention relates more particularly to trucks of this general type that are employed in factories, warehouses, etc. to pick up goods carried on skids or pallets, and transport them from one point to another within the building and deposit them in a desired location and at a desired height or level with no manual handling of the goods.

The principal object of the present invention is to provide a power driven material handling truck of the type described which is of comparatively light weight as compared with most of the trucks of this type at present on the market, so that it may be employed upon any of the floors of a building without concern over the safe floor weight of upper floors.

A further object of the invention is to provide an improved power driven material handling truck of the type described which is so arranged that the steering and driving mechanism are combined and the unit may be swung around in a comparatively small space.

A further object of the invention is to provide a power driven material handling truck of the type described which will have only one drive wheel, the said drive wheel being also rotatable to steer and direct the movement of the truck, the other load supporting wheels being disposed in the ends of the outriggers that extend forward on both sides of the lifting forks.

A further object of the invention is to so arrange the frame, outriggers and driver's platform with its associated power unit so that the width of the aisle space required for the movement of the truck into and out of its load receiving or load delivering position is reduced to a minimum.

A further object of the invention is to provide a comparatively simple motor mounting plate and kingpin construction in association with the driver's platform so that the driving wheel of the truck may be swung about in an arc of approximately 180 degrees, thereby giving far greater flexibility and ease to the operation of the same.

A further object of the invention is to provide an improved construction of mast and face plate for supporting the lifting forks, so arranged that unusual strength is acquired with comparatively simple construction and the arrangement of the lifting forks is such that the same may be separated or brought together depending upon the type of work to be accomplished by the same.

Other objects and advantages will be more apparent from the following description wherein reference is had to the accompanying drawings, upon which Fig. 1 is a side elevational view of a truck embodying the invention, with portions of the driver's platform, housing cabinet and single wheel drive broken in section to more clearly show other parts;

Fig. 2 is a plan view of the truck, the outriggers and lifting forks being broken to foreshorten the same;

Fig. 2-A is a cross-sectional view through one of the outriggers showing the manner in which the same are constructed;

Fig. 3 is a front perspective view of one of the lifting forks;

Fig. 4 is a fragmentary front elevational view of the mast, face plate and lifting forks shown in a raised position;

Fig. 5 is a plan sectional view showing the turntable to which the motor drive and steering apparatus are connected, the view being taken on the line 5—5 of Fig. 1; and Fig. 6 is a fragmentary cross-sectional view through a portion of one of the fork and face plate members showing the means for securing the spacing adjustment between the lifting forks.

Figure 1:
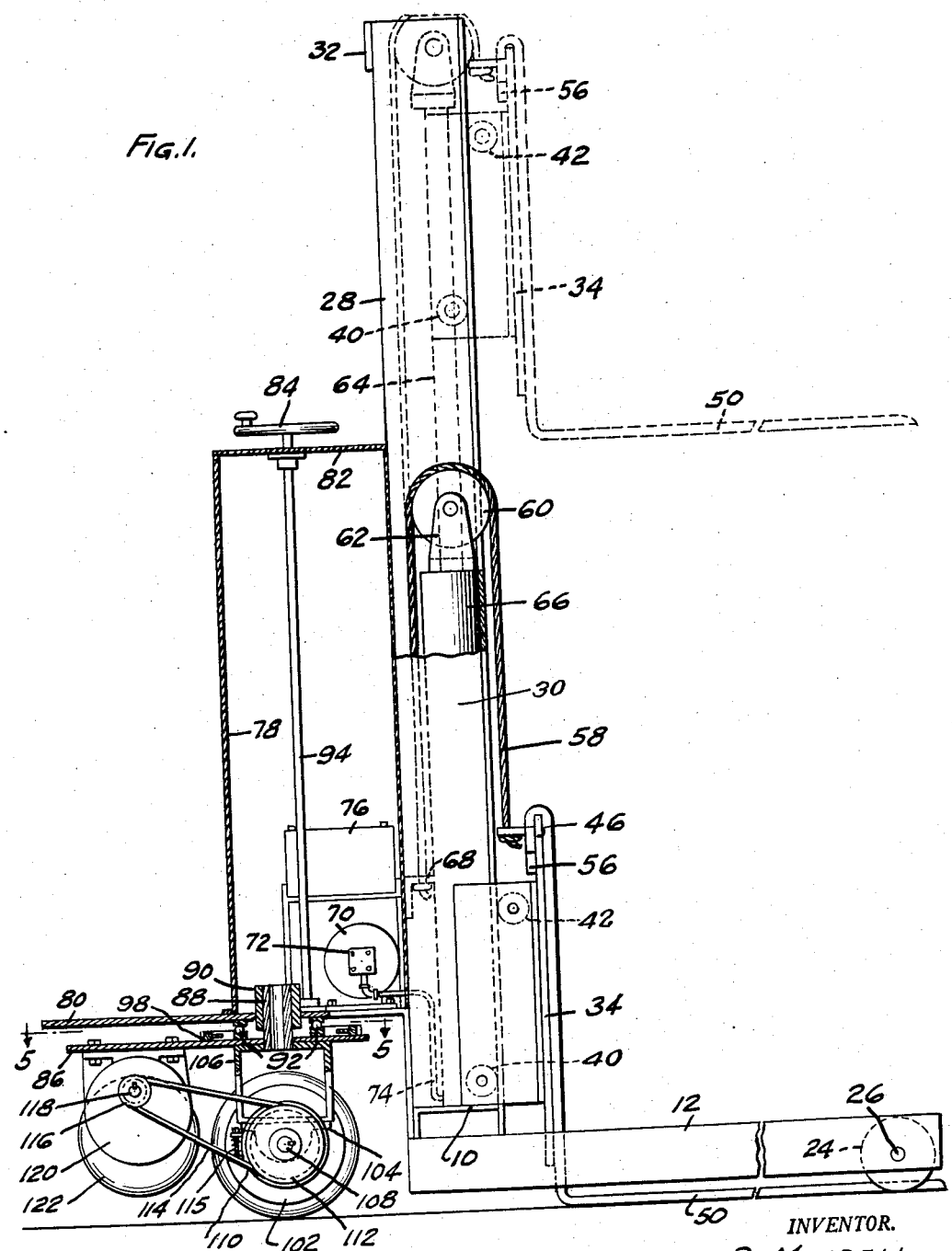

In the embodiment of the invention which I have chosen to illustrate and describe the same, I have provided a horizontally disposed frame 10 which may be in the form of an inverted channel, welded or otherwise suitably secured to a pair of generally rectangularly shaped outriggers 12 and 14.

As best shown in Fig. 2-A, the outriggers may have the top wall 16, parallel side walls 18 and 20, and inwardly extending bottom wall portions 22. At the extreme forward end of each of the outriggers 12 and 14, I mount suitable steel or other type wheels 24 upon axles 26, the wheels being free to rotate upon the same.

The mast for supporting the face plate and lifting forks may be in the form of Z-bars 28 and 30 riveted or otherwise secured at their lower ends to the top of the horizontal frame member 10 and provided with one or more suitable braces 32 for rigidity. The face plate 34 may be rectangular in shape and provided with a pair of angle shaped brackets 36 and 38 welded or otherwise suitably secured to the back of the same, each of the brackets 36 and 38 carrying a pair of rollers 40 and 42, the rollers being located adjacent the lower and upper ends of the support brackets and so spaced that they will ride upon opposite sides of one of the short legs of the mast uprights 28 and 30.

The lifting forks 44 are provided at their upper ends with a hook portion 46 for engaging over the top end of the face plate 34, and include a vertical leg 48 adapted to lie against the front of the face plate 34 and provided with a forwardly extending prong portion 50 which normally extends to the vicinity of the ends of the outriggers 12 and 14. Each of the vertical legs 48 of the fork is provided with a rearwardly extending pin member 52 which, when the fork has been hooked over the upper edge of the face plate, will drop into one of an aligned row of openings 54 adjacent the lower end of the face plate 34. In this position the fork is locked against sideways movement on the front of the face plate and the forks may thus be positioned on the face plates at any desired separated distance, depending upon the type of lifting to be done by the truck. It is also a simple matter to change the spacing by moving the forward end of the prongs 50 forward to disengage the pin members 52 from the positioning openings 54.

The lifting mechanism for raising the face plate and fork members may be of the usual hydraulically operated type, the back of the face plate 34 having an angle member 56 welded or otherwise secured thereto. A chain or cable 58 is connected to the bracket 56 and passes over a pulley 60 carried in a fork 62 on the upper end of a piston or plunger 64 of a vertical hydraulic ram or jack 66 mounted at its lower end upon the top of the cross-frame 10. At its other end the cable 58 is connected to a cross-bar 68 fastened between the uprights 28 and 30 of the mast 10.

It will thus be seen that when hydraulic fluid such as oil is introduced under pressure into the cylinder of the ram or jack 66 of the hydraulic lifting mechanism to cause the plunger to move upwardly, for each inch of vertical movement of the plunger there will be two inches of vertical movement of the face plate 34 and lifting forks 44 of the mechanism.

As hereinbefore stated, the particular form of lifting mechanism which is connected to the power unit of the present invention may of course be varied, but I prefer to provide a motor 70 and a hydraulic pump 72 connected by a usual conduit 74 with the hydraulic jack 66, the motor 70 being driven by the storage battery 76, as is well known in the art. The motor storage battery and associated parts are preferably located in a housing 78 which is mounted on the top of the driver's platform 80, the housing having a top wall 82 with a steering wheel 84 positioned thereabove.

The mechanism for driving and steering the unit may include a turntable 86 which has a hollow kingpin 88 welded or otherwise securely fastened thereto, the kingpin 88 extending upwardly through a bearing 90 which is fastened in the driver's platform 80. The weight of the truck and platform are supported upon the turntable 86 by means of a thrust bearing 92 which surrounds the kingpin 88 and its bearing 90.

The steering is accomplished by means of a steering rod or column 94 which extends downwardly from the steering wheel 84 through a suitable bearing in the platform 80 and has a pinion gear 96 keyed thereto at its lower end. The pinion gear 96 meshes with the teeth of a ring gear 98 that is fastened to the top of the turntable 86 by a plurality of bolt members 100. Thus when the hand or steering wheel 84 is rotated, the pinion will rotate the ring gear 98 and turntable 86 on the kingpin 88.

The combined driving and steering wheel 102 may be mounted below the turntable 86 by means of a pair of brackets 104 bolted to the lower end of a rectangularly shaped frame 106 welded or otherwise secured to the lower side of the turntable 86. The brackets 104 carry a horizontal shaft 108 to which the wheel 102 is keyed, the shaft 108 also carrying a brake drum 110 and a pulley 112 at its end. The pulley 112 is driven by means of a V-belt 114 from a driving pulley 116 which is keyed to a shaft 118 that extends from a gear reduction mechanism 120 attached to a driving motor 122. The motor and gear reduction are fastened to the lower side of the turntable 86 as shown.

The various controls for both starting and stopping the motor 122 and for operating the hydraulic lift jack 66 may be mounted upon a suitable control panel C fastened to one side of the housing 78 on the driver's platform 80. This mechanism may be of the usual type to include a "dead man's" brake 121 which operates to stop the controls in the usual manner whenever the truck is unattended. The brake may be of the usual type which includes a spring member 115 capable of being released by the driver as he stands on the platform, and which automatically brakes when the operator takes his foot off the foot pedal 121.

From the foregoing description it can be seen that with the improved construction and arrangement of parts which I have provided in a power driven material handling truck, the truck is of comparatively light weight as contrasted with those at present on the market. It can operate in close quarters and narrow aisles, and due to the simplicity of the steering and driving mechanism, it is capable of being moved in and about in previously inaccessible places and also upon upper floors which normally are incapable of holding heavier trucks of this type.

Due to the simplicity of construction, it can be seen that for repair and replacement of any of the driving mechanism, it is only necessary to remove the turntable, all of the parts thereof being easily accessible after its removal.

I contemplate that changes and modifications may be made in the exact details shown and I do not wish to be limited in any particular; rather what I desire to secure and protect by Letters Patent of the United States is:

A power driven material handling truck having in combination a horizontal base frame, a pair of fixedly mounted horizontally disposed outriggers, supporting wheels at the forward ends of each of said outriggers, a driver's platform connected to the back of said base frame, a vertically disposed bearing in said platform medially between said outriggers, a turntable having a kingpin mounted in said bearing and disposed below said platform, a single driving wheel mounted directly below said turntable and on its vertical axis, a hydraulic jack mounted on said base, a pair of vertical parallel uprights, a carrier reciprocally mounted on the front of said uprights and a connection between said carrier and said hydraulic jack for raising and lowering the same, said turntable having a face gear secured to the top of the same, a pinion meshing therewith, a vertical shaft extending from said pinion above said driver's platform and a steering wheel connected to the upper end of said shaft.

References Cited in the file of this patent
UNITED STATES PATENTS

| | | |
|---|---|---|
| 1,001,837 | Fuller | Aug. 29, 1911 |
| 1,661,852 | Remde | Mar. 6, 1928 |
| 2,114,156 | Towson | Apr. 12, 1938 |
| 2,305,578 | Ulinski | Dec. 15, 1942 |
| 2,320,600 | Howell | June 1, 1943 |
| 2,395,345 | Schreck | Feb. 19, 1946 |
| 2,496,399 | Lesser | Feb. 7, 1950 |
| 2,596,747 | Ward et al. | May 13, 1952 |
| 2,668,602 | Cushman | Feb. 9, 1954 |
| 2,678,746 | Gibson | May 18, 1954 |
| 2,713,918 | Framhein | July 26, 1955 |